United States Patent [19]

Willson et al.

[11] Patent Number: 5,169,167

[45] Date of Patent: Dec. 8, 1992

[54] TRACTOR FRONT FENDER ASSEMBLY FOR STEERABLE WHEELS

[75] Inventors: Leonard D. Willson; Iain G. Low, both of Essex, England

[73] Assignee: Ford New Holland, Inc., New Holland, Pa.

[21] Appl. No.: 888,095

[22] Filed: May 26, 1992

[51] Int. Cl.$^5$ ............................................. B62D 25/18
[52] U.S. Cl. ................................... 280/157; 280/96.1;
180/900; 172/509; 248/299; 296/198
[58] Field of Search ....................... 280/96.1, 96.3, 97,
280/760, 847, 848, 849, 853, 854, 152.05, 154,
156, 157; 180/900; 172/112, 508, 509; 296/198;
248/299

[56] References Cited

U.S. PATENT DOCUMENTS

| | | | |
|---|---|---|---|
| 415,021 | 11/1889 | Brown | 280/157 |
| 4,442,477 | 4/1984 | Hennessey | 180/900 X |
| 5,074,573 | 12/1991 | Dick | 280/157 |

FOREIGN PATENT DOCUMENTS

| | | | |
|---|---|---|---|
| 3214901 | 10/1983 | Fed. Rep. of Germany | 280/847 |
| 3402754 | 8/1985 | Fed. Rep. of Germany | 280/849 |
| 496435 | 11/1938 | United Kingdom | 280/96.1 |

Primary Examiner—Brian Johnson
Attorney, Agent, or Firm—Larry W. Miller; Frank A. Seemar

[57] ABSTRACT

A mechanism for mounting the front fender for an agricultural tractor wherein the support structure includes an arcuate mounting bracket connected to the front wheel to be pivotally moveable therewith, an arcuate support bracket detachably connected to the mounting bracket and slidable over top thereof, and a stanchion interconnecting the support bracket and the fender to locate the fender adjacent the circumference of the front tire. The mounting bracket is provided with a plurality of slotted openings alignable with holes in the support bracket to permit fasteners to extend therethrough for detachably connecting the support bracket to the mounting bracket. Both the mounting bracket and support bracket have a center of curvature coinciding with the axis of rotation of the corresponding tire such that a slidable movement of the support bracket over the surface of the mounting bracket can adjustably position the fender around the circumference of the corresponding tire. An adjustable connection of the stanchion to the support bracket permits a radial adjustment of the fender relative to the tire. A transverse adjustable positioning of the support bracket over the mounting bracket further permits a transverse adjustable positioning of the fender relative to the tire.

15 Claims, 3 Drawing Sheets

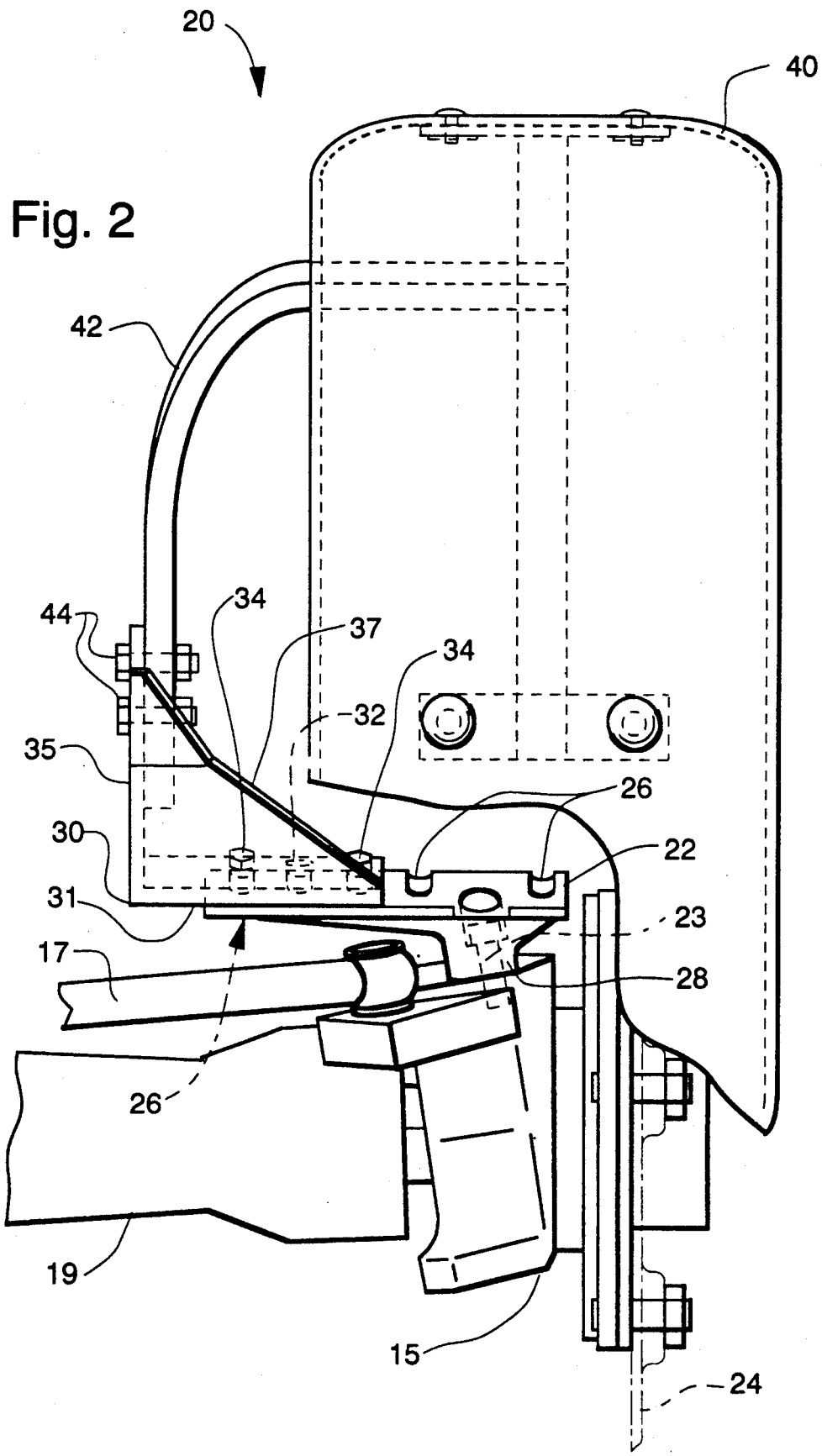

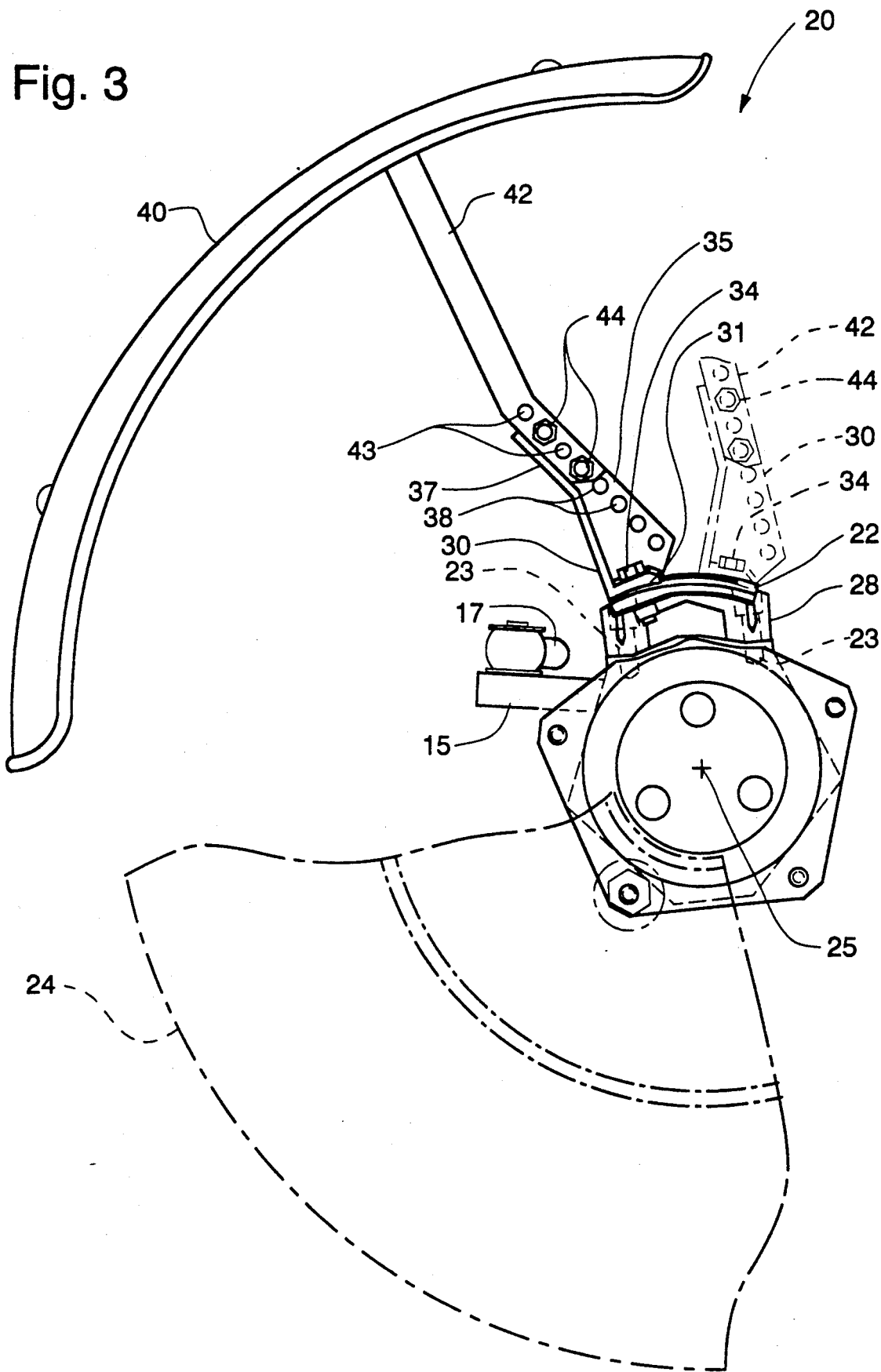

TRACTOR FRONT FENDER ASSEMBLY FOR STEERABLE WHEELS

BACKGROUND OF THE INVENTION

The present invention relates generally to agricultural tractors and, more particularly, to a mechanism for mounting a front fender for a three-way adjustable positioning thereof.

Tractors typically are equipped with a chassis supported above the ground by a pair of transversely spaced rear drive wheels and a pair transversely spaced steerable front wheels, which may also be powered to provide a four wheel drive for the tractor. Optional fenders can be positioned in close proximity above and behind the front wheels to prevent debris from being ejected off the front tires and being scattered all over the tractor and/or the operator. While adjustable positioning of the front fender is desirable to accommodate different size tires, wheel spacings, and operations, a mechanism for quickly and easily affecting all such positional adjustments has not been made readily available.

Accordingly, it would be advantageous to provide a front fender mounting mechanism to allow positional adjustments of the front fender in at least three different directions relative to the corresponding tire in a convenient manner.

SUMMARY OF THE INVENTION

It is an object of this invention to overcome the aforementioned disadvantages of the prior art by providing a front fender mounting mechanism for an agricultural tractor in which the fender can be positionally adjusted in three separate directions.

It is an advantage of this invention that the front fender mounting mechanism can allow a positional adjustment of the front fender around the circumference of the corresponding tire.

It is another advantage of this invention that the front fender mounting mechanism will permit a radial adjustment of the fender relative to the tire to accommodate different sized tires.

It is still another advantage of this invention that the front fender mounting mechanism will permit a transverse positional adjustment of the front fender to accommodate different size tires and allow the fender to be centered over the corresponding tire.

It is a feature of this invention that the circumferential adjustment of the fender can be accomplished without removal of fasteners connecting the support bracket to the mounting bracket.

It is another feature of this invention that the positional adjustments of the fender can be quickly and easily accomplished.

It is another object of this invention to provide a front fender mounting mechanism that will permit a positional adjustment of the fender to correspond to road transport and field operative positions without requiring the removal of hardware or a disassembling of the fender mechanism.

It is still another feature of this invention that the front fender mechanism can be adjustably positioned to absorb manufacturing tolerances permitting a uniform positioning of the fender relative to the corresponding tire.

It is still another object of this invention to provide a front fender mounting mechanism for an agricultural tractor which is durable in construction, inexpensive of manufacture, carefree of maintenance, facile in assemblage, and simple and effective in use.

These and other objects, features and advantages are accomplished according to the instant invention by providing a mechanism for mounting the front fender for an agricultural tractor wherein the support structure includes an arcuate mounting bracket connected to the front wheel to be pivotally moveable therewith, an arcuate support bracket detachably connected to the mounting bracket and slidable over top thereof, and a stanchion interconnecting the support bracket and the fender to locate the fender adjacent the circumference of the front tire. The mounting bracket is provided with a plurality of slotted openings alignable with holes in the support bracket to permit fasteners to extend therethrough for detachably connecting the support bracket to the mounting bracket. Both the mounting bracket and the support bracket have a center of curvature coinciding with the axis of rotation of the corresponding tire such that a slidable movement of the support bracket over the surface of the mounting bracket can adjustably position the fender around the circumference of the corresponding tire. An adjustable connection of the stanchion to the support bracket permits a radial adjustment of the fender relative to the tire. A transverse adjustable positioning of the support bracket over the mounting bracket further permits a transverse adjustable positioning of the fender relative to the tire.

BRIEF DESCRIPTION OF THE DRAWINGS

The advantages of this invention will become apparent upon consideration of the following detailed disclosure of the invention, especially when taken into conjunction with the accompanying drawings wherein:

FIG. 2 is an enlarged rear elevational view of the right front wheel and associated fender mounting mechanism corresponding to lines 2—2 of FIG. 1, portions of the fender being broken away for purposes of clarity; and FIG. 3 is an enlarged partial side elevational view of the right front wheel showing the fender mounting mechanism, a portion of the corresponding circular tire being shown in phantom, the positional movement of the support bracket relative to the mounting bracket also being shown in phantom.

DETAILED DESCRIPTION OF THE PREFERRED EMBODIMENT

Figure 1:
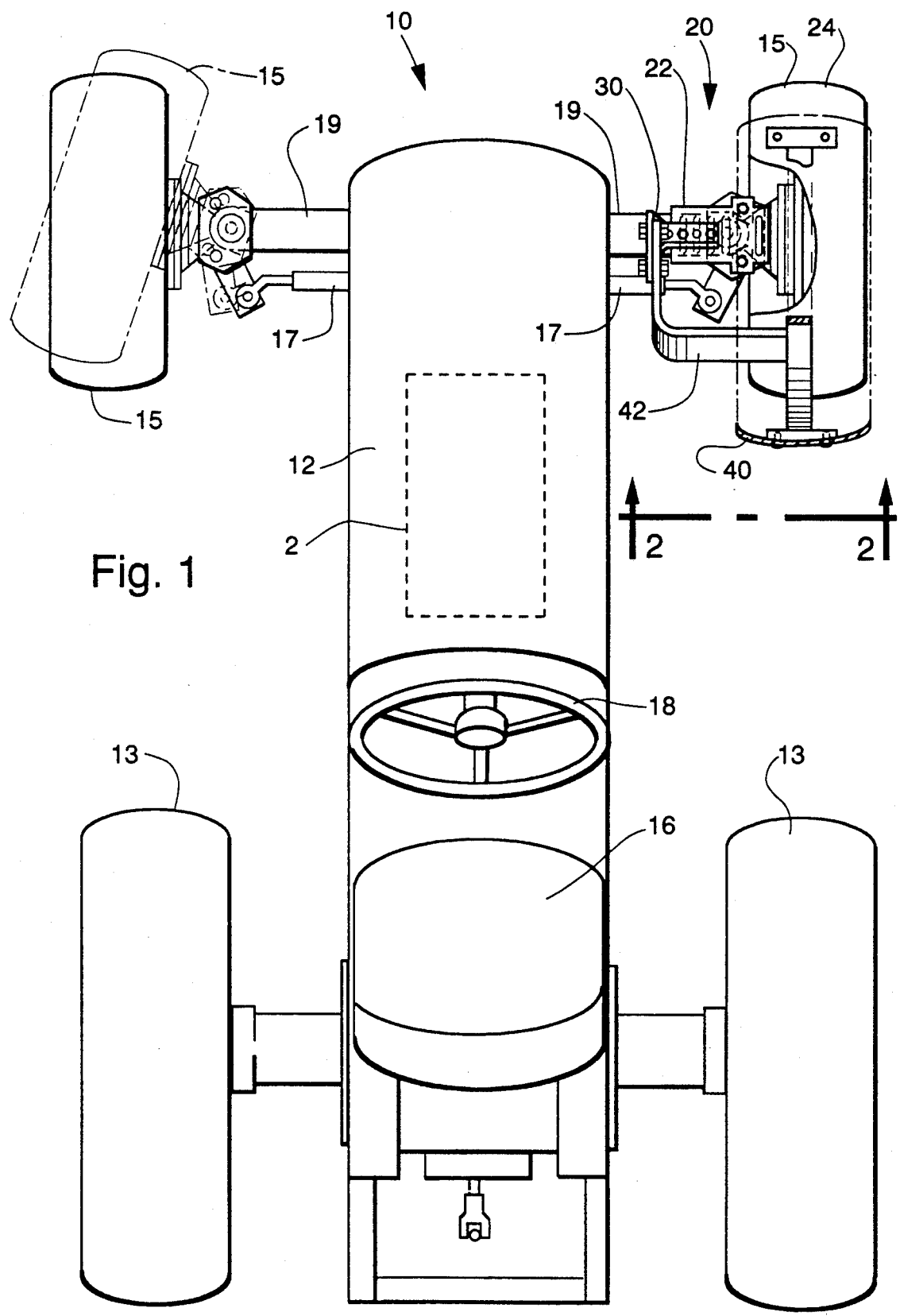
FIG. 1 is a top plan schematic view of a tractor incorporating the principles of the instant invention, the left front fender and mounting mechanism being removed for purposes of clarity, the pivotal movement of the front wheels being exhibited by the phantom lines associated with the left front wheel, portions of the right front fender and corresponding tire being broken away for purposes of clarity.

Referring now to FIG. 1, a top plan view of an agricultural tractor incorporating the principles of the instant invention can best be seen. Any right and left references are used as a matter of convenience and are determined by standing at the rear of the tractor facing the forward end, the direction of travel. The tractor 10 includes a chassis 12 supported over the ground by a pair of transversely spaced rear drive wheels 13 and a pair of transversely spaced front steerable wheel assemblies 15. As schematically depicted in FIG. 1, agricultural tractors are typically provided with an operator's compartment 16 and a conventional steering wheel 18 operable to control the steering movement of the front steerable wheels 15 in a conventional manner.

The forward end of the tractor 10 usually is provided with a positionally fixed front axle 19 to which are pivotally connected the front steerable wheels 15. As best shown in phantom relative to the left steerable wheel assembly 15, a conventional manipulation of the steering wheel 18 will control the pivotal movement of the front wheels 15 relative to the front axle 19 through operation of the conventional steering mechanism 17 to affect a steering of the tractor 10 over the ground. The axle may be provided with a power means or drive mechanism to provide rotational power to both of the front steerable wheels 15 in a conventional manner, thereby providing a four-wheel drive apparatus for the tractor 10. The right front steerable wheel assembly 15 is shown as being provided with an optional fender assembly 20 to prevent dirt, water, or other debris from being discharged rearwardly toward the operator positioned in the operators compartment 16.

Referring now to FIGS. 1-3, and particularly to the enlarged views of FIGS. 2 and 3, the front fender assembly 20 can best be seen. The front fender assembly 20 includes a mounting bracket 22 detachably affixed by fasteners 23 to the pivotally moveable wheel assembly 15, to which the steering mechanism 17 is attached to affect the pivotal movement thereof relative to the front axle 19. Accordingly, the entire front fender assembly 20, which is mounted on the mounting bracket 22 and described in greater detail below, pivotally moves with the corresponding wheel assembly 15 relative to the front axle 19.

The mounting bracket 22 has an arcuate shape which when mounted on the wheel assembly 15 has its center of curvature generally aligned with the transversely extending axis of rotation of the corresponding tire 24 forming a part of the steerable wheel assembly 15. The mounting bracket 22 is fixed to the steerable wheel assembly 15 by the detachable fasteners 23 so that the mounting bracket 22 is moveable in unison therewith. The mounting bracket 22 is provided with a plurality of longitudinally extending slotted openings 26 which extend through the arcuate body of the mounting bracket 22. As best seen in FIG. 2, the mounting bracket 22 is transversely elongated to accommodate several transversely spaced elongated slots 26 while providing a base portion 28 through which the fasteners 23 pass for connection thereof to the pivoted wheel assembly 15.

The front fender assembly 20 further includes a support bracket 30 having an arcuate body 31 of the same configuration as the mounting bracket 22 such that when the support bracket 30 is mounted on the mounting bracket 22, the center of curvature for the body portion 31 also coincides with the axis of rotation 25 of the corresponding rotatable tire 24. The body portion 31 of the support bracket 30 is provided with a plurality of transversely spaced holes 32 therethrough with a transverse spacing to correspond to the transverse spacing of the slotted openings 26 in the mounting bracket 22 so that the holes 32 can be aligned with selected ones of the slotted openings 26 in the mounting bracket 22 for mounting thereon. At least 2 fasteners 34 inserted through aligned holes 32 and slotted openings 26 detachably connect the support bracket 30 to the mounting bracket 22.

The support bracket 30 is also provided with an upwardly extending support leg 35 extending generally radially with respect to the axis of rotation 25 and generally perpendicularly to the arcuate body portion 31. Preferably, the support leg 35 is integrally formed with the body portion 31 and may be reinforced by a cross-connecting web 37 extending between the support leg 35 and the body portion 31 to provide strength and integrity to the support bracket 30. The support leg 35 is provided with a plurality of generally aligned holes 38 extending therethrough and arranged in a linear manner oriented generally radially with respect to the axis of rotation 25. Alternatively, the support leg 35 could be provided with a single elongated slot (not shown) to substitute for the linearly arranged holes 38.

The front fender assembly 20 is further provided with fender member 40 having a radially extending stanchion 42 including a plurality of holes 43 extending therethrough in a configuration to be alignable with the holes 38 in the support leg 35 of the support bracket 30. Preferably, the fender member 40 has a generally arcuate shape having its center of curvature coinciding generally with the axis of rotation 25 of the corresponding rotatable tire 24 so that adjustable movements of the fender member 40, which can be affected by a relative movement between the support bracket 30 and the mounting bracket 22, will be generally parallel to the outer circumferential periphery of the rotatable tire 24. A pair of fasteners 44 extending through aligned holes in the stanchion 42 and the support link 35 detachably connect the fender member 40 to the support bracket 30.

Adjustable positioning of the fender member 40 can be accomplished in three independent directions. By slidably moving the support bracket 30 over the arcuate surface of the mounting bracket 22, which movement would correspond to a rotational movement of the support bracket 30 about the axis of rotation 25, the fender member 40 can be positionally moved from a transport position as shown in solid lines in FIG. 3 to a field position corresponding to the phantom bracket shown in FIG. 3. Such positional movement rotates the fender member 40 about the axis of rotation 25 and, therefore, allows the fender member 40 to maintain its predetermined proximity to the periphery of the rotatable tire 24 throughout this range of positional movements. This circumferential movement of the fender member 40 can be accomplished simply by loosening the fasteners 34 and allowing the fasteners to ride along the slotted openings 26 in the mounting bracket 22.

A subsequent tightening of the fasteners 34 will positionally fix the support bracket 30, and therefore the fender member 40, to the mounting bracket 22 in the subsequently selected position. One skilled in the art will readily realize that additional design choices could be made to incorporate additional fasteners 34 to provide greater stability between the support bracket 30 and the mounting bracket 22; however, it has been found that 2 transversely spaced fasteners interengaged between the support bracket 30 and the mounting bracket 22 provided sufficient stability for the fender member 40 in the configuration shown in FIGS. 1-3.

A second positional adjustment of the fender member 40 can be accomplished by positionally moving the stanchion 42 along the length of the support leg 35, thereby aligning holes 43 with different selected holes 38 in the support leg 35. As a result, the fender member 40 is moved generally radially with respect to the rotatable tire 24 to enable the fender member 40 to be positioned at the desired location relative to the circumferential periphery of the rotatable tire 24, which will permit accommodation of the front fender assembly 20 to different sizes of the rotatable tire 24.

The third positional movement of the fender member 40 relative to the tire 24 is accomplished by a transverse movement of the support bracket 30 relative to the mounting bracket 22. As best seen in FIG. 2, the holes 32 in the arcuate body portion 31 of the support bracket 30 can be transversely positioned to align with different transversely spaced combinations of arcuate slotted openings 26 in the mounting bracket 22. This transverse movement of the support bracket 30 relative to the mounting bracket 22 results in a corresponding transverse movement of the fender member 40 relative to the rotatable tire 24 to accommodate different size tires as well as positional movements of the rotatable tire 24 corresponding to a change in wheel spacing, etc. Once the support bracket 30 has been properly aligned in the desired location relative to the mounting bracket 22, the fasteners 34 can be inserted through the aligned holes 32 and slotted openings 26, whereupon subsequent circumferential adjustment of the fender member 40 as described above can be accomplished without further removal of the fasteners 34 from the support bracket 30 or any disassembly of the front fender assembly 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis supported above the ground by a pair of transversely spaced rear wheels and a pair of transversely spaced front wheels, said front wheels being pivotally connected to said chassis and including a pair of corresponding tires rotatable about an axis of rotation; power means supported on said chassis and operably connected to at least one of said pairs of wheels to provide a source of power for operative movement of said chassis over the ground; a steering mechanism interconnecting said front wheels and said chassis to control the pivotal movement of said front wheels for selectively steering the movement of said chassis over the ground; a fender mounted on each said front wheel for pivotal movement therewith relative to said chassis, each said fender including a support structure and a fender member positionable such that a portion thereof can be oriented behind a corresponding tire; an improved fender support structure comprising:
   an arcuate mounting bracket connected to a corresponding front wheel to be pivotally moveable therewith, said mounting bracket having a center of curvature generally alignable with the axis of rotation of said corresponding tire;
   an arcuate support bracket with means for detachable and selective connection to said mounting bracket and having a center of curvature generally alignable with the axis of rotation of said corresponding tire, said support bracket and said mounting bracket having corresponding configurations to permit a slidable movement of said support bracket over an zipper surface of said mounting bracket; and
   a stanchion interconnecting said support bracket and said fender member to locate said fender member remote from said axis of rotation around the circumference of the corresponding tire, said fender member being selectively positionable around the circumference of the corresponding tire by the selective positioning of said support bracket relative to said mounting bracket.

2. The tractor of claim 1 wherein said connection means allows said stanchion to be adjustably positioned relative to said support bracket to permit a selective positioning of said fender member generally radially relative to the axis of rotation of said corresponding tire.

3. The tractor of claim 2 wherein at least one of said support bracket and said mounting bracket is provided with at least one circumferentially extending slotted opening to receive a fastener interengaging said support bracket and said mounting bracket, such that said support bracket is slidably moveable along said mounting bracket upon a loosening of said fastener without requiring a removal therefrom.

4. The tractor of claim 3 wherein said mounting bracket is provided with a plurality of circumferentially extending slotted openings, said support bracket being provided with a corresponding plurality of holes therein to receive fasteners therethrough for engagement with said mounting bracket through corresponding slotted openings.

5. The tractor of claim 4 wherein said fender member is selectively positionable transversely relative to the corresponding tire by a selective alignment of openings in said support bracket with said slotted openings in said mounting bracket.

6. The tractor of claim 3 wherein said support bracket includes a radially extending support leg connectable with said stanchion, said stanchion being connectable to said support leg at a plurality of positions to locate said fender member at a selected position radially relative to said axis of rotation.

7. The tractor of claim 6 wherein said fender member is generally arcuate in shape with a center of curvature generally aligned with said axis of rotation.

8. The tractor of claim 6 wherein said mounting bracket includes means for detachable connection to said wheel.

9. A fender assembly for a tractor having a chassis, a pair of transversely spaced rear drive wheels, a pair of transversely spaced front steerable wheels mounted for pivotal movement relative to said chassis, a steering mechanism operably interconnecting said chassis and said front wheels to control the pivotal movement thereof, each said front wheel including a tire rotatable about a generally transversely extending axis of rotation, comprising:
   an arcuate mounting bracket connected to each said front steerable wheel to be pivotally moveable therewith, said mounting bracket having a center of curvature generally aligned with the axis of rotation of a corresponding tire;
   an arcuate support bracket with means for detachable and selective connection to each said mounting bracket and having a center of curvature generally aligned with the axis of rotation of said corresponding tire said support bracket and said mounting bracket having corresponding configurations to permit a slidable arcuate movement of said support bracket over an upper surface of said mounting bracket generally centered about said axis of rotation;

a fender member mounted adjacent the periphery of each said corresponding tire and being positionable such that at least a portion thereof can be oriented behind the corresponding tire; and a stanchion interconnecting said support bracket and said fender member to locate said fender member remote from said axis of rotation around the circumference of the corresponding tire, said fender member being selectively positionable relative to the corresponding tire by the selective positioning of said support bracket relative to said mounting bracket.

10. The tractor of claim 9 wherein at least one of said support bracket and said mounting bracket is provided with at least one circumferentially extending slotted opening to receive a fastener interengaging said support bracket and said mounting bracket, such that said support bracket is slidably moveable along said mounting bracket upon a loosening of said fastener without requiring a removal therefrom.

11. The tractor of claim 10 wherein said mounting bracket is provided with a plurality of circumferentially extending slotted openings, said support bracket being provided with a corresponding plurality of holes therein to receive fasteners therethrough for engagement with said mounting bracket through corresponding slotted openings.

12. The tractor of claim 10 wherein said support bracket includes a radially extending support leg connectable with said stanchion at a plurality of positions to locate said fender member at a selected position radially relative to said axis of rotation.

13. The tractor of claim 12 wherein said fender member is selectively positionable transversely relative to the corresponding tire by a selective alignment of openings in said support bracket with said slotted openings in said mounting bracket.

14. The tractor of claim 13 wherein said mounting bracket is detachably connected to said wheel by fasteners.

15. The tractor of claim 13 wherein said support leg is provided with a plurality of holes extending therethrough and being oriented along a line extending generally radially relative to said axis of rotation, said stanchion having a plurality of holes extending therethrough and alignable with said holes in said support leg to permit detachable fasteners to be inserted through aligned holes to detachably connect said stanchion to said support leg.

* * * * *